United States Patent Office 2,815,331
Patented Dec. 3, 1957

2,815,331

CARBON MONOXIDE CONVERSION CATALYST
AND METHOD OF PREPARING SAME

Kenneth D. Ashley, Stamford, Conn., Samuel I. Federman, East Orange, N. J., and William B. Innes, Stamford, Conn., assignors to American Cyanamid Company, New York, N. Y., a corporation of Maine No Drawing. Application December 4, 1953,
Serial No. 396,303

8 Claims. (Cl. 252—373)

This invention relates to catalytic materials for use in carrying out chemical reactions between gases, to methods of preparing the same and to commercial processes using such catalytic materials. More particularly, this invention relates to chromium oxide-promoted iron oxide catalysts to be used in the water-gas shift reaction for the production of gaseous mixtures containing carbon monoxide, carbon dioxide and hydrogen by passing a mixture of gases containing carbon monoxide and water vapor over said catalyst at elevated temperatures; to methods of preparing such an improved catalyst; and to the commercial processes employing such a catalyst.

In the water-gas shift process which may be represented by the following equation $$CO + H_2O \rightleftharpoons CO_2 + H_2$$

many catalytic materials having widely varying chemical compositions have been employed and, although commercial success has been noted in the case of some of these materials, considerable room for improvement still exists in this field.

For example, a catalyst, in order to be usable on a commercial scale, must not only have a high enough crush strength to resist disintegration, crushing or crumbling during handling and loading operations, but it must also maintain its crush strength during actual usage under commercial reactor conditions. If such a property were absent, the catalyst would be rapidly reduced to a state of fineness and dustiness which would seriously reduce gas velocities and drastically decrease plant throughput.

A principal purpose of the present invention is therefore to prepare an improved catalyst of an extremely rugged nature and capable of resisting such fragmentation and disintegration.

Additionally, a catalyst should possess a high activity on a volume basis whereby a smaller catalyst volume for a given purpose would be required, consequently rendering possible the use of smaller and less expensive convertors for equivalent purposes. Such a factor would be highly valuable in presently-operating, fixed-volume convertors wherein the use of such an improved catalyst would enable an increase in plant capacity without installing additional convertors.

In addition to high activity, the catalyst should also have good thermal resistance whereby only a small loss of activity is observed when it is subjected to high temperatures, such as are encountered in commercial operations.

In a similar way, it is desired that the activity of the catalyst also remain high at low temperatures inasmuch as, for any specific steam:gas ratio, the yield of hydrogen is increased and the carbon monoxide is more completely converted to carbon dioxide at such low temperatures. At the same time, low water to carbon monoxide ratios are desirable inasmuch as the decreased water requirement provides for substantial savings in capital investment and operating costs.

Another principal purpose of the present invention is therefore to prepare an improved catalyst having a high activity on a volume basis, particularly at low temperatures, accompanied by good thermal resistance whereby increased capacity and improved yield per convertor volume is attained and maintained in commercial operation, as well as a low water to carbon monoxide ratio as low as about 3 or 4 to 1.

At the same time, a low bulk density is desirable in such a catalyst inasmuch as a smaller weight of catalyst will be required for a given convertor volume. This will result in a substantial saving in catalyst cost inasmuch as catalyst is sold on a weight basis.

Still another principal purpose of the present invention is therefore to prepare an inproved catalyst of low bulk density.

Such catalysts should furthermore possess high resistance to any undesirable effects of exposure to liquid water, such as would be present due to the condensation of the steam used in the process. The catalyst should resist disintegration or dissolution under such moisture conditions to prevent impeding the normal flow of the gases which could bring about expensive and time-consuming shutdowns and replacements of the catalyst.

Additionally, the catalyst should possess a high resistance to impairment and/or breakdown when used with a gas having a relatively high concentration of impurities such as sulfur compounds or acetylene, kerosene and the like.

It is therefore a further principal object of the present invention to prepare a catalyst having improved resistance to liquid water, kerosene, sulfur compounds, or unsaturated materials such as acetylene, and the like.

It has been found that the above-mentioned purposes may be accomplished by means of an improved carbon monoxide convertor catalyst which may be prepared by forming an intimate moistened mixture of iron oxide and ammonium dichromate or ammonium chromate, forming the mixture into shaped configurations, if so desired, and drying the mixture. The dried mixture may then be calcined and is then ready to be loaded into the reactors for actual commercial use.

The chromium-containing compound may be mixed with the iron oxide by any conventional method such as, for example, by dissolving the chromium-containing compound in water or other suitable solvent and then spraying the resulting solution on or otherwise mixing it with the iron oxide, which is preferably in powdered form, until a wet slurry or moist mixture is formed. Additional iron oxide powder may then be added, as desired, and the wet slurry mixed constantly and thoroughly until the proper or required consistency for molding or other working is attained. Another method of preparation, for example, would comprise a dry mixing of the ammonium dichromate or chromate with the iron oxide, followed by the addition of sufficient water to moisten or wet down the mix to form a plastic mass of the proper consistency. The moldable mass, as prepared by these or other equivalent processes, may then be dried and granulated or, if desired, may be shaped into any desired configuration, while still moistened and moldable, such as by being extruded, formed into thin sheets, pelleted or tableted and then dried. The dried product is then calcined at temperatures of from about the decomposition temperature up to about 1200° F. in order to decompose the chromium-containing compound into chromium oxide and non-objectionable gases, the latter being readily removed.

The amount of the chromium-containing compound which is added to the mix should be such that the calculated chromium oxide ($Cr_2O_3$) content of the finished catalyst falls within a range of from about 0.5% to about 15% by weight on a dry basis with the iron oxide having a minimum concentration of about 85% by weight. The percentage of the chromia content depends upon many factors such as the contemplated use of the catalyst, the desired promoter effect, the nature of the gaseous mixture which is to be converted, etc., and we have found that in the normal case a range of from about 3% to about 7% of chromium oxide by weight with the maximum concentration of iron oxide being about 97% by weight is preferred.

A conventional water-insoluble lubricant may be added to the plastic mixture in order to facilitate the pelleting, extruding or other forming of the catalyst. The quantity of water-insoluble lubricant added depends to a large extent upon its properties and general effectiveness as well as upon the particular characteristics to be imparted to the plastic mixture. However, in general, we have found that from about 0.1% to about 10% by weight of water-insoluble lubricant is preferred. Although the invention will be described primarily with graphite as the preferred lubricant, such is not to be construed as limitative of the invention, inasmuch as other lubricants may be employed such as: talc, colloidal clay; hydrocarbon oils and waxes; higher molecular weight fatty acids (stearic, palmitic, oleic, etc.); esters of higher molecular weight fatty acids such as, for example, the glycerides of such acids; the insoluble salts of the higher molecular weight fatty acids, notably the zinc, magnesium and calcium salts, and the like. The amount used of any particular lubricant will vary as to its specific characteristics and it has been determined that graphite, for example, functions best in concentrations of from about 0.5% to about 10% by weight. Magnesium stearate, on the other hand, may be used in a percentage range of 0.1% to about 4.0%, for example.

The invention will be further described in greater detail by the following specific examples. It is to be understood, however, that although these examples may describe in particular detail some of the specific features of the invention, they are given primarily for purposes of illustration and the invention in its broader aspects is not to be construed as limited thereto.

EXAMPLE 1

3.9 pounds of ammonium dichromate was added in the form of a hot 18% solution to approximately 50 pounds of red iron oxide powder in a small, pan-type mixer. The solution was thoroughly mixed for about 15 minutes and then approximately 10 pounds of additional red iron oxide was added in order to granulate the mix. This was followed by the addition of approximately 5 pounds of a lubricant, such as graphite. The moist plastic mixture was then extruded through a 9/32 inch die, dried for approximately two hours in an air oven at a temperature of about 280° F. and calcined for more than one hour at 1100° F. The amount of ammonium dichromate added in this particular form was sufficient to yield a catalyst containing approximately 3.8% chromia ($Cr_2O_3$) by weight.

The chemical analysis of this particular convertor catalyst was as follows:

*Table I*

|  | Percent |
| --- | --- |
| L. O. I. | 0.5 |
| $Fe_2O_3$ | 95.0 |
| $Cr_2O_3$ | 3.8 |
| $SiO_2$ | 0.2 |
| $SO_3$ | 0.2 |

EXAMPLE 2

500 pounds of a pigment-grade iron oxide, such as Williams R-1599 red iron oxide, was charged to a conventional type muller. This particular material was a very active iron oxide which was thermally stable and was made by the thermal decomposition, under controlled oxidizing temperatures, of ferrous sulfate, followed by water grinding and washing to eliminate traces of soluble salts. With the mixer on, 225 pounds of a promoter solution comprising an 18% solution of ammonium dichromate $(NH_4)_2Cr_2O_7$ prepared from 40 pounds of ammonium dichromate and 181.5 pounds of water was rapidly added to the iron oxide in the muller. The solution and the iron oxide were allowed to mull for approximately 10 minutes. Then an additional 150 pounds of red iron oxide was added over a 10-minute period and the mixture was allowed to mull for an additional 10 minutes. At the end of that time, the mixture was in a granular state. 20 pounds of graphite as a lubricant was then added and the damp mixture was extruded with the cutter set at 200 R. P. M. (a reading of 400) using a multihole die in which the holes had a diameter of 19/64 inch. The cutter speed was so adjusted that the average pellet length was approximately 1/4 inch to about 3/8 inch. The extruded product was transferred to a small belt drier and run into an indirect fired kiln maintained at a temperature of from about 500° C. to about 620° C. Calcination for about one hour took place and the calcined pellets were discharged to be screened and then stored or packaged, as desired.

EXAMPLE 3

600 grams of red iron oxide ($Fe_2O_3$), 50 grams of ammonium dichromate and 260 ml. of water were used to prepare a moldable mix as follows: The ammonium dichromate was dissolved in 150 ml. of water. The iron oxide was placed in a suitable container and positioned on the kneading machine. The ammonium dichromate solution was then added to the iron oxide while continuously kneading. 110 ml. of water was then added and the kneading continued until a workable mixture was obtained. The mixture was placed in a tray drier for approximately 4 hours and was maintained at a temperature of approximately 240° F. The dried mixture was then broken into particles approximately 5–10 mm. in size and placed in a muffle furnace maintained at a temperature of approximately 1100° F. for approximately two hours. The resulting calcined catalytic material had a chromia content of approximately 5% by weight.

EXAMPLE 4

600 grams of a pigment grade iron oxide, such as Williams R-1599, 100 grams of ammonium dichromate and 250 ml. of water were used to prepare a chromia-promoted catalyst having a chromia content of approximately 10%. The ammonium dichromate was dissolved in 200 ml. of warm water and the solution was added to the iron oxide with continuous intermixing. 50 ml. of water was then added and the mixture was kneaded until a workable mixture was obtained. The mixture was removed from the kneader and placed in a tray drier maintained at a temperature of approximately 240° F. for approximately four hours. The dried cake was removed from the drier and broken into particles approximately 5 to 10 mm. in size and screened. This material was then placed in a muffle furnace maintained at a temperature between 940° F. and 1100° F. for a period of approximately two hours. The resulting catalyst had a chromia content of approximately 10% by weight on a dry basis and possessed good resistance to sulfur gases, acetylene and kerosene.

EXAMPLE 5

50 pounds of a pigment grade red iron oxide, and a solution formed from 4.43 pounds of ammonium dichromate and 20 pounds of water were used to prepare an extrudable mixture as follows: The solution was added to the iron oxide with continuous agitation. 7.5 pounds of iron oxide and 0.5 pound of graphite were then added and the entire mixture agitated. The mixture was then extruded into pellets, dried for two hours at approximately 280° F. and then calcined for approximately 1 hour at 1100° F. Several samples of the pellets were analyzed and found to have a chromia content between 3.9% and 4.1%.

EXAMPLE 6

66 pounds of a pigment grade iron oxide (Williams R–1599), 25 pounds of a 17.5% solution of ammonium dichromate and 2 pounds of graphite were used in order to form an extrudable mixture for the chromia promoted iron oxide catalyst. The total mixing time was approximately 20 minutes. The extrusion took place through a multihole die (38 holes) with the diameter of each hole being 19/64 inch with a cutter reading of 250. The material extruded very easily with practically no sticking.

EXAMPLE 7

50 pounds of a pigment grade red iron oxide, such as Williams R–1599, and a solution formed from 5.34 pounds of ammonium chromate and 20 pounds of water were used to prepare a moldable mixture suitable for calcining into a catalyst for the production of hydrogen and carbon dioxide by the reaction of carbon monoxide and water vapor. The solution was added to the red iron oxide with continuous agitation. 7 pounds of additional red iron oxide and 0.5 pound of graphite were added and the entire mixture agitated. The mixture was then dried for approximately 2 hours at a temperature of about 280° F. and then calcined for approximately 1 hour in a muffle furnace maintained at a temperature of approximately 1100° F. Several samples of the resulting product were analyzed and found to have a chromia content of approximately 4.2% by weight.

In the following testing of the catalyst of the present invention, an "aged" catalyst is defined as one which has been aged for 16 hours at a temperature of about 625° C. in flowing gas (35% CO and 65% $H_2$) (SV=200/hr.) plus steam (SV=1370/hr.).

The effect of kerosene vapors in the gas stream on the activity of the catalyst of the present invention was determined as follows: A reactor was packed with approximately 550 cc. of aged catalyst. A cup containing liquid kerosene was fitted in a T to the gas line carrying the gaseous mixture to the reactor. After approximately 45 hours of operating time, a water bath was placed underneath the kerosene cup and the temperature of the water was heated to and maintained at approximately 100° C. This was done in order to evaporate a considerable quantity of kerosene and to test the catalyst under conditions more severe than could be expected. The entrainment of kerosene vapors during the run was approximately 2.4 lbs. of kerosene per 20,000 lbs. of gas.

The conditions during the run were as follows: the space velocity (STP) was 770/hr.; the steam to gas ratio was 1.13:1; the reactor pressure was 100 p. s. i. g.; and the feed gas had an approximate composition of 60% hydrogen, 28% carbon monoxide, 6% methane, 6% carbon dioxide, 0.2% acetylene and 0.2% oxygen.

The percent of carbon monoxide conversion was checked for 77 hours at 425° C. and found to be 81.3% and then checked for 17.5 hours at 375° C. and found to be 40.5%. The results so obtained agree approximately with previous runs performed under similar conditions but without kerosene vapors in the gas stream. No visible carbon deposition was observed in the catalyst after the run. The fines obtained amounted to approximately 0.5% per weight of total catalyst and it is to be noted that this amount of fines is usually obtained after each run. From this data it can be seen that kerosene vapors do not effect the activity of the present catalyst.

The effect of steaming on the catalyst of the present invention was investigated under the following conditions: The catalyst used was an aged catalyst as described above; the space velocity (STP) was 700/hr.; the steam to gas ratio was 1:1; the reactor pressures were 0, 22 and 100 p. s. i. g.; and the feed gas had the approximate composition of 55% hydrogen, 25% nitrogen, 10% carbon monoxide and 10% carbon dioxide. The reactor was packed with 550 cc. of aged catalyst of the present invention and was reduced for a period of approximately two hours at a temperature of about 450° C. with a mixture of gas consisting of 35% carbon monoxide and 65% hydrogen at a space velocity of 145/hr. and a steam to gas ratio of 10:1. The reactor pressure was atmospheric. The catalyst was then aged for 16 hours at the same conditions except that the temperature was raised to 625° C.

The feed gas mixture was then introduced at the conditions described above and the percent of carbon monoxide conversion was checked at 425° C. and atmospheric pressure. The catalyst was then steamed for 30 minutes at the same temperature and the percent conversion was rechecked after that period with the original feed gas mixture. The same procedure was followed at pressures of 22 and 100 p. s. i. g.

In Table II is found a tabulation of the results obtained.

Table II

| T., ° C. | Pressure, P. s. i. g. | Steaming period, hrs. | Percent CO conversion | Time, hrs. when sample was taken following steaming per. |
|---|---|---|---|---|
| 428 | 0 | | 79.8 | |
| 427 | 0 | 0.5 | 81.5 | 3.50 |
| 425 | 22 | | 81.5 | |
| 430 | 22 | 0.5 | 86.5 | 3.50 |
| 430 | 100 | | 86.5 | |
| 425 | 100 | 0.5 | 80.2 | 1.50 |

From the above data, it could be determined that no large effect on the activity was observed.

The effect of acetylene on the catalyst of the present invention was investigated as follows. The conditions of the test were: Aged catalyst was used; the space velocity was 770/hr.; the steam to gas ratio was 1.13:1; the reactor pressure was 100 p. s. i. g.; the feed gas mixture had an approximate composition as follows: 50% hydrogen, 15–21% acetylene, 4–11% carbon dioxide, 20% carbon monoxide and 6% methane; and the comparative gas mixture approximately contained 60% hydrogen, 28% carbon monoxide, 6% carbon dioxide, 6% methane, 0.2% acetylene and 0.2% oxygen.

The reactor was packed with 550 cc. of aged catalyst of the present invention. At the beginning, the percent of carbon monoxide conversion was checked at 425° C. with the comparative feed gas mixture under the conditions described above. After this, the feed gas mixture containing a high amount of acetylene was introduced for one hour, maintaining the same pressure, the same steam to gas ratio and the same temperature. Samples were taken after 15 and 45 minutes and the temperatures were checked every 10 to 15 minutes. The percent of carbon monoxide conversion was then rechecked with the original mixture containing merely 0.2% acetylene. The gas mixture containing the high amount of acetylene was then introduced for an additional hour.

In Table III is set forth a tabulation of the results obtained. From this data, it may be concluded that the presence of 14.9% and 21.1% acetylene in the gas stream did not affect the activity of the catalyst of the present invention. It is to be noted that the acetylene decomposed upon contact with the catalyst, about 0.2% to about 0.6% remained unchanged, 3.5% to about 4.2% of unsaturates (probably ethylene, propylene, etc.) were formed, and an increase of methane was noted in the exit gas.

Table III

| T., °C. | Inlet gas, percent comp. | Percent CO conv. | Percent C₂H₂ in exit gas | Percent unsats. in exit gas | Percent CO in exit gas | Remarks |
|---|---|---|---|---|---|---|
| 425 | 10.7-CO₂<br>14.9-C₂H₂<br>47-H₂<br>17.8-CO<br>7.0-CH₄ | | 0.5 | 4.0 | 6.0 | Sample taken 15 min. after introduction of gas mixture. |
| 425 | Same as Above | | 0.5 | 3.7 | 3.7 | Sample taken 45 min. after introduction of gas mixture. |
| 425 | Comparative gas mixture | 81 | | 0.2 | 5.4 | |
| 425 | 3.7-CO₂<br>21.1-C₂H₂<br>49.2-H₂<br>18.8-CO<br>5.0-CH₄ | | 0.6 | 4.2 | 6.5 | Sample taken 15 min. after introduction of gas mixture. |
| 425 | Same as above | | 0.6 | 3.8 | 6.6 | Sample taken 45 min. after introduction of gas mixture. |

Inasmuch as there is merely on the order of about 0.2% to 0.3% acetylene in the feed gas under normal conditions and up to possibly 8–11% under abnormal conditions (such as when there is no scrubbing), the use of feed mixtures containing such percentages of acetylene was also investigated. As expected, the use of such lower percentages also did not affect the activity of the catalyst.

The effect of hydrogen sulfide on the catalyst of the present invention was investigated by a method involving the alternate feeding of a 50% carbon monoxide—50% hydrogen—sulfur-free gas mixture and a gas mixture containing 0.6% hydrogen sulfide at a pressure of 350 p. s. i. g. and at a temperature of 350° C.

450 cc. of the catalyst of the present invention were reduced and aged by the usual procedure. The percent carbon monoxide conversion was then checked using the aged catalyst with a sulfur-free gas mixture consisting of 50% carbon monoxide and 50% hydrogen. The run was performed at a pressure of 350 p. s. i. g. and at a temperature of 350° C. The conditions were maintained at 770/hr., space velocity (STP) and a steam to gas ratio of 1.5:1. The catalyst was then dumped and the reactor was reduced for 12 hours with hydrogen at a temperature of 500° C. and afterwards saturated for a period of three hours at a temperature of 350° C. and a pressure of 350 p. s. i. g. with a gas mixture consisting of 99.4% nitrogen and 0.6% hydrogen sulfide.

The reactor was then repacked with the catalyst and the percent carbon monoxide conversion was checked alternately with the sulfur-free gas mixture and the one containing 0.6% hydrogen sulfide at 770/hr. space velocity, 1.5:1 steam to gas ratio, 350° C. and a reactor pressure of 350 p. s. i. g. A tabulation of the results obtained in this run are set forth in Table IV.

Table IV

| Time, hrs. from start | Temp., °C., at bottom of bed | Percent H₂S in inlet gas | Percent H₂S in exit gas | Percent CO conv. |
|---|---|---|---|---|
| 0 | | None | | |
| 7.75 | 348 | None | | 70.3 |
| 28.25 | 352 | 0.605 | 0.210 | |
| 30.25 | 352 | 0.605 | | 73.3 |
| 34.25 | 346 | 0.605 | 0.230 | |
| 35.00 | 357 | 0.605 | | 74.5 |
| 36.25 | | None | | 71.1 |
| 40.50 | 348 | None | | 71.9 |
| 44.75 | 350 | None | | |
| 51.25 | | 0.54 | | |
| 52.25 | | 0.54 | 0.450 | |
| 53.75 | | 0.54 | 0.174 | |
| 54.25 | 360 | 0.54 | | 77.8 |
| 57.00 | | 0.54 | 0.201 | |
| 58.00 | 350 | 0.54 | | 67.0 |
| 59.50 | | None | | |
| 63.50 | 352 | None | | 72.2 |
| 75.50 | 352 | None | | 74.4 |

From the above data it can be concluded that the activity of the catalyst was not affected while operating under a pressure of 350 p. s. i. g. The percent carbon monoxide conversion was approximately 72%±2% as compared to 70% when a sulfur-free gas mixture was used.

The typical properties of the catalyst of the present invention as compared to other catalysts now in use in industry are as follows:

Table V

| | Present invention | Catalyst H | Catalyst G |
|---|---|---|---|
| I. Chemical analysis (ignited 1,000° C. basis, weight percent): | | | |
| L. O. I. | 0.5 | 5.0 | 22.0. |
| Fe₂O₃ | 95.0 | 83.0 | 87.0. |
| Cr₂O₃ | 4.0 | 4.0 | 11.0. |
| SO₃ | 0.2 | 0.3 | 0.2. |
| MgO | 0.0 | 0.0 | 1.0. |
| II. Physical properties: | | | |
| A. Pellet size, inches: | | | |
| Average diameter | 0.30 | 0.44 | 0.37. |
| Average length | 0.33 | 0.25 | 0.30. |
| Percent fines (minus 4 mesh [1]) | 2.00 | 1.00 | 1.00. |
| B. Crush strength, lbs.: | | | |
| Initial, average | 47.6 | 20 | 30.* |
| Percent under 10 lbs. | 0 | 6 | |
| After usage, average | 40.2 | 24 | 30.* |
| After wetting with water for 6 hrs. at room temp | 36.1 | 5 | 5. |
| C. Bulk density,[2] gm./cc. | 1.30 | 1.13 | 1.40.* |
| D. Dustiness characteristics | Non-dusty | Dusty | Dusty. |
| III. Catalytic efficiency: | | | |
| A. Initial activity: | | | |
| Percent conversion of CO to CO₂ at standard condition A.[3] | 92 | 81 | 86. |
| Same, except 400° C. instead of 450° C | 89 | 75 | 80. |
| B. Stability: Percent conversion at standard condition A after accelerated aging.[4] | 87 | 75 | 81. |
| IV. Resistance to poisoning (sulfur gases, acetylene, kerosene, etc.). | Good | Poor | Poor (acetylene) |

[1] U. S. Sieve Serial (0.187″ openings).
[2] Fill pint can (3¹¹⁄₁₆″ x 3⁵⁄₁₆″ diameter). Put on vibratory jigsaw platform (1 min.). Adjust level to brim with no projecting catalyst.
[3] 450° C., 2000 hrs.⁻¹ space velocity, 2.2 steam:gas ratio, dry gas: 35% CO, 65% H₂; 90 cc. catalyst in 2″ tube.
[4] Aged for 16 hours at 625° C. in flowing gas (35% CO, 65% H₂) (SV=200 hours⁻¹) plus steam (SV=1370 hours⁻¹).
*Variable.

Although we have described but a few specific examples of our inventive concept and several tests thereof, as well as the chemical and physical characteristics of a particular sample thereof, we consider the same not to be limited to the specific substances mentioned therein but to include various other compounds of equivalent constitution as set forth in the claims appended hereto. It is understood, of course, that any suitable changes, modifications and variations may be made without departing from the spirit and scope of the invention.

We claim:

1. In a method of preparing catalytic material for the production of hydrogen and carbon dioxide by the reaction of carbon monoxide and water vapor, the steps of forming an intimate moistened mixture of from about 85% to about 97% of iron oxide and from about 0.5% to about 15% of a member of the group consisting of ammonium dichromate and ammonium chromate, said percentages being by weight, ignited basis, with the iron oxide being calculated as $Fe_2O_3$ and said member being calculater as $Cr_2O_7$, based on the total weight of $Fe_2O_3$ and $Cr_2O_7$ present and drying the mixture.

2. A method as defined in claim 1 wherein from about 3% to about 7% of said member is present.

3. In a method of preparing a catalyst for the production of hydrogen and carbon dioxide by the reaction of carbon monoxide and water vapor, the steps of forming an intimate moistened mixture of from about 85% to about 97% of iron oxide and from about 0.5% to about 15% of a member of the group consisting of ammonium dichromate and ammonium chromate, said percentages being by weight, ignited basis, with the iron oxide being calculated as $Fe_2O_3$ and said member being calculated as $Cr_2O_7$, based on the total weight of $Fe_2O_3$ and $Cr_2O_7$ present, shaping said mixture into a desired configuration and drying the shaped mixture.

4. A method as defined in claim 3 wherein from about 3% to about 7% of said member is present.

5. A method as defined in claim 3 wherein from about 0.5% to about 10% by weight of graphite is added to facilitate the shaping of said mixture.

6. A process which comprises reacting carbon monoxide and water vapor to produce hydrogen and carbon dioxide by passing a gas mixture containing carbon monoxide and water vapor at a temperature above 350° C. in contact with a catalyst prepared by forming an intimate moistened mixture of from about 85% to about 97% iron oxide and from about 0.5% to about 15% of a member of the group consisting of ammonium dichromate and ammonium chromate said percentages being by weight, ignited basis, with the iron oxide being calculated as $Fe_2O_3$ and said member being calculated as $Cr_2O_7$, based on the total weight of $Fe_2O_3$ and $Cr_2O_7$ present, and drying the mixture.

7. A process as defined in claim 6 wherein from about 3% to about 7% of said member is present.

8. A process which comprises reacting carbon monoxide and water vapor to produce hydrogen and carbon dioxide by passing a gas mixture containing carbon monoxide and water vapor at a temperature above 350° C. in contact with a catalyst prepared by forming an intimate moistened mixture of from about 85% to about 97% of iron oxide and from about 0.5% to about 15% of a member of the group consisting of ammonium dichromate and ammonium chromate, said percentages being by weight, ignited basis, with the iron oxide being calculated as $Fe_2O_3$ and said member being calculated as $Cr_2O_7$, based on the total weight of $Fe_2O_3$ and $Cr_2O_7$ present, shaping said mixture into a desired configuration and drying the shaped mixture.

References Cited in the file of this patent

UNITED STATES PATENTS

| | | |
|---|---|---|
| 2,435,551 | Black et al. | Feb. 3, 1948 |
| 2,436,616 | Sumerford | Feb. 24, 1948 |
| 2,602,020 | Christian et al. | July 1, 1952 |
| 2,631,086 | Moak et al. | Mar. 10, 1953 |
| 2,662,063 | Christian et al. | Dec. 8, 1953 |
| 2,678,264 | Corner | May 11, 1954 |